US008929600B2

(12) United States Patent
Liu et al.

(10) Patent No.: US 8,929,600 B2
(45) Date of Patent: Jan. 6, 2015

(54) ACTION RECOGNITION BASED ON DEPTH MAPS

(71) Applicant: Microsoft Corporation, Redmond, WA (US)

(72) Inventors: Zicheng Liu, Bellevue, WA (US); Jiang Wang, Evanston, IL (US)

(73) Assignee: Microsoft Corporation, Redmond, WA (US)

(*) Notice: Subject to any disclaimer, the term of this patent is extended or adjusted under 35 U.S.C. 154(b) by 197 days.

(21) Appl. No.: 13/719,274

(22) Filed: Dec. 19, 2012

(65) Prior Publication Data

US 2014/0169623 A1 Jun. 19, 2014

(51) Int. Cl.
*G06K 9/00* (2006.01)
*G06T 13/00* (2011.01)

(52) U.S. Cl.
CPC .................................. *G06K 9/00335* (2013.01)
USPC ........................................... 382/103; 345/473

(58) Field of Classification Search
USPC .......... 382/103, 107, 159, 181, 236; 348/154, 348/155, 169, 170, 171, 172, 352; 345/473, 345/632, 633
See application file for complete search history.

(56) References Cited

U.S. PATENT DOCUMENTS

| | | | |
|---|---|---|---|
| 7,874,917 B2 * | 1/2011 | Marks et al. ..................... | 463/36 |
| 8,009,022 B2 | 8/2011 | Kipman et al. | |
| 8,072,470 B2 * | 12/2011 | Marks ........................... | 345/632 |
| 2011/0054870 A1 | 3/2011 | Dariush et al. | |

OTHER PUBLICATIONS

Zhang, Zhengyou., "Microsoft Kinect Sensor and Its Effect", Retrieved Oct. 1, 2012 at <<http://ieeexplore.ieee.org/stamp/stamp.jsp?tp=&arnumber=6190806>>, Journal of IEEE Multimedia, vol. 19, Issue 2, Apr. 2012, pp. 4-10.
Yang, et al., "Recognizing Actions Using Depth Motion Maps-based Histograms of Oriented Gradients", Retrieved Oct. 1, 2012 at <<http://media-lab.engr.ccny.cuny.edu/Paper/2012/acm_mm_2012.pdf>>, In Proceedings of the 20th ACM International conference on Multimedia (MM'12), Oct. 29-Nov. 2, 2012, pp. 1057-1060.
Ellis, et al., "Exploring the Trade-off Between Accuracy and Observational Latency in Action Recognition", Retrieved Oct. 1, 2012 at <<http://www.cs.ucf.edu/~mtappen/pubs/2012/ellis-et-al-ijcv-2012.pdf>>, International Journal of Computer Vision, Aug. 18, 2012, pp. 17.
Lai, et al., "Sparse Distance Learning for Object Recognition Combining RGB and Depth Information", Retrieved Oct. 1, 2012 at <<http://ieeexplore.ieee.org/stamp/stamp.jsp?tp=&arnumber=5980377>>, Proceedings of IEEE International Conference on Robotics and Automation (ICRA), May 9, 2011, Shanghai, China, pp. 7.

(Continued)

*Primary Examiner* — Abolfazl Tabatabai
(74) *Attorney, Agent, or Firm* — Judy Yee; Sandy Swain; Micky Minhas

(57) ABSTRACT

A plurality of depth maps corresponding to respective depth measurements determined over a respective plurality of time frames may be obtained. A plurality of skeleton representations respectively corresponding to the respective time frames may be obtained. Each skeleton representation may include joints associated with an observed entity. Local feature descriptors corresponding to the respective time frames may be determined, based on the depth maps and the joints associated with the skeleton representations. An activity recognition associated with the observed entity may be determined, based on the obtained skeleton representations and the determined local feature descriptors.

20 Claims, 13 Drawing Sheets

(56) References Cited

OTHER PUBLICATIONS

Agrawal, et al., "Fast Algorithms for Mining Association Rules", Retrieved Oct. 3, 2012 at <<http://rakesh.agrawal-family.com/papers/vldb94apriori.pdf>>, Proceedings of the 20th International Conference on Very Large Data Bases, Sep. 12, 1994, pp. 13.

Campbell, et al., "Recognition of Human Body Motion Using Phase Space Constraints", Retrieved Oct. 3, 2012 at <<http://ieeexplore.ieee.org/stamp/stamp.jsp?tp=&arnumber=466880>>, Proceedings of Fifth International Conference on Computer Vision, Jun. 20, 1995, pp. 624-630.

Chapelle, et al., "Choosing Multiple Parameters for Support Vector Machines", Retrieved Oct. 3, 2012 at <<http://research.microsoft.com/en-us/um/people/manik/projects/trade-off/papers/chapelleml02.pdf>>, Machine Learning, vol. 46, Issue 1-3, Jan. 2002, pp. 131-159.

Dai, et al., "Detector Ensemble", Retrieved Oct. 3, 2012 at <<http://users.eecs.northwestern.edu/~sda690/Ensemble_CVPR07.pdf>>, In Proceedings of IEEE Computer Society Conference on Computer Vision and Pattern Recognition (CVPR'07), Jun. 18, 2007, pp. 8.

Dalal, et al., "Histograms of Oriented Gradients for Human Detection", Retrieved Oct. 3, 2012 at <<http://ieeexplore.ieee.org/stamp/stamp.jsp?tp=&arnumber=1467360>>, In Proceedings of the 2005 IEEE Computer Society Conference on Computer Vision and Pattern Recognition (CVPR'05), vol. 1, Jun. 25, 2005, pp. 886-893.

Friedman, et al., "Predictive Learning Via Rule Ensembles", Retrieved Oct. 3, 2012 at <<http://projecteuclid.org/DPubS/Repository/1.0/Disseminate?view=body&id=pdfview_1&handle=euclid.aoas/1223908046>>, In The Annals of Applied Statistics, vol. 2, No. 3 (2008), pp. 916-954.

Laptev, Ivan., "On Space-Time Interest Points", Retrieved Oct. 3, 2012 at <<http://citeseerx.ist.psu.edu/viewdoc/download?doi=10.1.1.158.9437&rep=rep1&type=pdf>>, International Journal of Computer Vision, vol. 64, Issue 2-3, 2005, pp. 107-123.

Laptev, et al., "Learning Realistic Human Actions from Movies", Retrieved Oct. 3, 2012 at <<http://ieeexplore.ieee.org/stamp/stamp.jsp?tp=&arnumber=4587756>>, In Proceedings of the IEEE Conference on Computer Vision and Pattern Recognition, Jun. 23, 2008, pp. 8.

Lazebnik, et al., "Beyond Bags of Features: Spatial Pyramid Matching for Recognizing Natural Scene Categories", Retrieved Oct. 3, 2012 at <<http://ieeexplore.ieee.org/stamp/stamp.jsp?tp=&arnumber=1641019>>, In Proceedings of the 2006 IEEE Computer Society Conference on Computer Vision and Pattern Recognition (CVPR'06), vol. 2, Jun. 17, 2006, pp. 2169-2178.

Li, et al., "Time Series Clustering: Complex is Simpler!", Retrieved Oct. 3, 2012 at <<http://www.cs.cmu.edu/~badityap/papers/cldsicml11.pdf>>, Proceedings of the 28th International Conference on Machine Learning, Jun. 28, 2011, pp. 8.

Li, et al., "Action Recognition Based on A Bag of 3D Points", Retrieved Oct. 3, 2012 at <<http://research.microsoft.com/en-us/um/people/zhang/Papers/cvpr4hb10_05.pdf>>, Proceedings of the Int. Conf. Computer Vision and Pattern Recognition, Jun. 13, 2010, pp. 6.

Lv, et al., "Recognition and Segmentation of 3-D Human Action Using Hmm and Multi-Class Adaboost", Retrieved Oct. 3, 2012 at <<http://vipbase.net/homepage/action3d_eccv.pdf>>, Proceedings of the 9th European Conference on Computer Vision (ECCV'06), May 7, 2006, pp. 359-372.

Martens, et al., "Learning Recurrent Neural Networks with Hessian-Free Optimization", Retrieved Oct. 3, 2012 at <<http://www.icml-2011.org/papers/532_icmlpaper.pdf>>, Proceedings of the 28th International Conference on Machine Learning, Jun. 28, 2011, pp. 8.

Muller, et al., "Motion Templates for Automatic Classification and Retrieval of Motion Capture Data", Retrieved Oct. 3, 2012 at <<http://www.mpi-inf-mpg.de/~mmueller/publications/2006_MuellerRoeder_MotionTemplates_SCA.pdf>>, Proceedings of the ACM SIGGRAPH/Eurographics Symposium on Computer Animation (SCA'06), Sep. 2, 2006, pp. 137-146.

Ning, et al., "Latent Pose Estimator for Continuous Action Recognition", Retrieved Oct. 3, 2012 at <<http://www.ifp.illinois.edu/~hning2/papers/pos_act.pdf>>, Proceedings of the 10th European Conference on Computer Vision (ECCV'08), Oct. 12, 2008, pp. 419-433.

Oppenheim, et al., "Discrete-Time Signal Processing", Retrieved Oct. 3, 2012 at <<http://een.iust.ac.ir/profs/Jahed/digital%20controll/e%20book/Discrete.Time.Signal.Processing.2nd.Ed.isbn.0137549202.pdf>>, Proceedings in Prentice Hall, Jan. 10, 1999, pp. 897.

Shotton, et al., "Real-Time Human Pose Recognition in Parts from Single Depth Images", Retrieved Oct. 3, 2012 at <<http://research.microsoft.com/pubs/145347/BodyPartRecognition.pdf>>, Proceedings in the 24th IEEE Conference on Computer Vision and Pattern Recognition (CVPR'11), Jun. 20, 2011, pp. 1297-1304.

Wu, et al., "Probability Estimates for Multi-class Classification by Pairwise Coupling", Journal of Machine Learning Research, vol. 5, Aug. 2004, pp. 975-1005.

Yao, et al., "Grouplet: A Structured Image Representation for Recognizing Human and Object Interactions", Retrieved Oct. 3, 2012 at <<http://ieeexplore.ieee.org/stamp/stamp.jsp?tp=&arnumber=5540234>>, Proceedings of the IEEE Conference on Computer Vision and Pattern Recognition, Jun. 13, 2010, pp. 8.

Yuan, et al., "Mining Discriminative Co-occurrence Patterns for Visual Recognition", PR !#)(7abx32http://ieeexplore.ieee.org/stamp/stamp.jsp?tp=&arnumber=5995476>>, Proceedings of the 2011 IEEE Conference on Computer Vision and Pattern Recognition (CVPR'11), Jun. 20, 2011, pp. 2777-2784.

Zhu, et al., "Max Margin and/or Graph Learning for Parsing the Human Body", Retrieved Oct. 3, 2012 at <<http://ieeexplore.ieee.org/stamp/stamp.jsp?tp=&arnumber=4587787>>, Proceedings of the IEEE Conference on Computer Vision and Pattern Recognition (CVPR 2008), Jun. 23, 2008, pp. 8.

Han, et al., "Discriminative Human Action Recognition in the Learned Hierarchical Manifold Space," Retrieved Nov. 23, 2012 at <<http://www.doc88.com/p-88662844302.html>>, Image and Vision Computing, 28(5), May 2010, pp. 836-849.

Wang, et al., "Mining Actionlet Ensemble for Action Recognition with Depth Cameras," Retrieved Sep. 26, 2012 at <<http://research.microsoft.com/en-us/um/people/zliu/papers/joint_modeling_final.pdf>>, IEEE Conference on Computer Vision and Pattern Recognition (CVPR 2012), Providence, Rhode Island, Jun. 16-21, 2012, 8 pages.

"Apriori Algorithm," Retrieved Dec. 3, 2012 at <<http://en.wikipedia.org/wiki/Apriori_algorithm>>, Wikipedia, Dec. 3, 2012, 4 pages.

Chang, et al., "LIBSVM: A Library for Support Vector Machines," Retrieved Nov. 16, 2012 at <<http://www.csie.ntu.edu.tw/~cjlin/papers/libsvm.pdf>>, last updated Apr. 4, 2012, 39 pages.

Chen, et al., "Human Action Recognition Using Star Skeleton," In Proceedings of the 4th ACM International Workshop on Video Surveillance and Sensor Networks (VSSN'06), pp. 171-178.

* cited by examiner

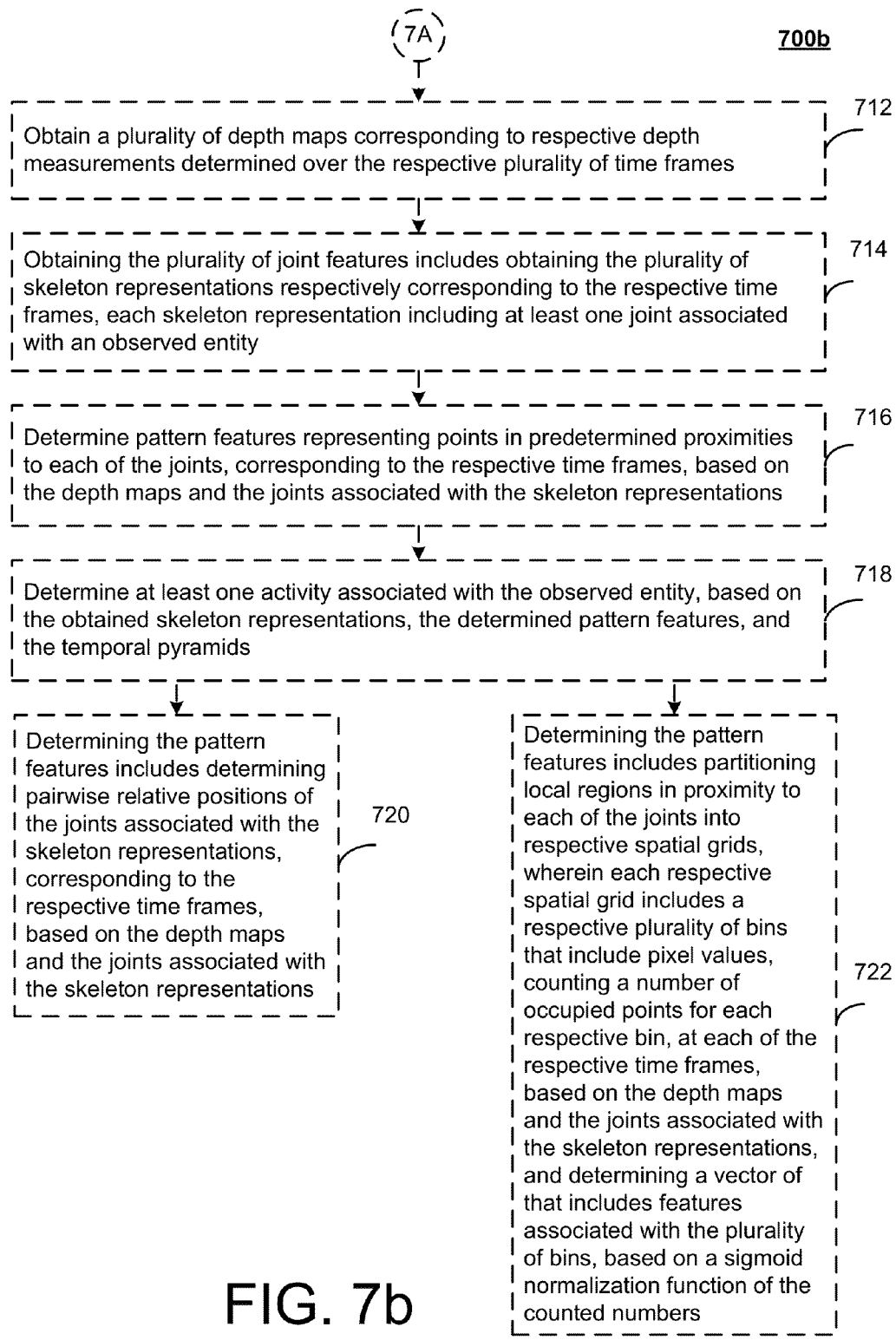

ACTION RECOGNITION BASED ON DEPTH MAPS

BACKGROUND

Recognition of activities of various entities (e.g., humans, animals, moving objects) has been an area of interest for many years. For example, some potential applications may include video surveillance, human computer interfaces, sports video analysis and video retrieval. Despite research efforts over many years, accurate recognition of actions, or activities, of entities continues to be a challenging task.

SUMMARY

According to one general aspect, a system may include a device that includes at least one processor. The device may include an activity recognition engine that includes instructions tangibly embodied on a computer readable storage medium for execution by the processor. The activity recognition engine may include a depth map acquisition component configured to obtain depth maps corresponding to respective depth measurements determined over respective time frames. A skeleton acquisition component may be configured to obtain skeleton representations respectively corresponding to the respective time frames. Each skeleton representation may include at least one joint associated with an observed entity. A local feature descriptor determination component may determine local feature descriptors corresponding to the respective time frames, based on the depth maps and the joints associated with the skeleton representations. An activity determination component may determine at least one activity recognition associated with the observed entity, based on the obtained skeleton representations and the determined local feature descriptors.

According to another aspect, a plurality of joint features may be obtained. The joint features may be associated with joints of a plurality of skeleton representations respectively representing respective positions of the joints and skeletons determined over a respective plurality of temporally ordered time frames. Transform values of joint features associated with the respective joints may be determined, based on temporally ordered temporal segments, each temporal segment including a portion of the plurality of time frames. Temporal pyramids may be determined based on recursively partitioning the joint features, based on recursively partitioning the temporal segments, and determining transform values of the partitioned joint features associated with each partitioned temporal segment.

According to another aspect, a computer program product tangibly embodied on a computer-readable storage medium may include executable code that may cause at least one data processing apparatus to obtain a plurality of depth maps corresponding to respective depth measurements determined over a respective plurality of temporally ordered time frames. Further, the data processing apparatus may obtain a plurality of skeleton representations respectively corresponding to the respective time frames, each skeleton representation including at least one joint associated with an observed entity. Further, the data processing apparatus may determine local feature descriptors corresponding to the respective time frames, based on the depth maps and the joints associated with the skeleton representations. Further, the data processing apparatus may determine a plurality of joint feature sets of the joints that are associated with a respective plurality of joint features. Further, the data processing apparatus may determine discriminative joint feature sets that are included in the plurality of joint feature sets, based on a determination of joint feature sets having a high level of confidence and a low level of ambiguity, based on a predetermined confidence threshold value, and a predetermined ambiguity threshold value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 7a-7b are a flowchart illustrating example operations of the system of FIG. 1.

DETAILED DESCRIPTION

I. Introduction

Figure 1A:
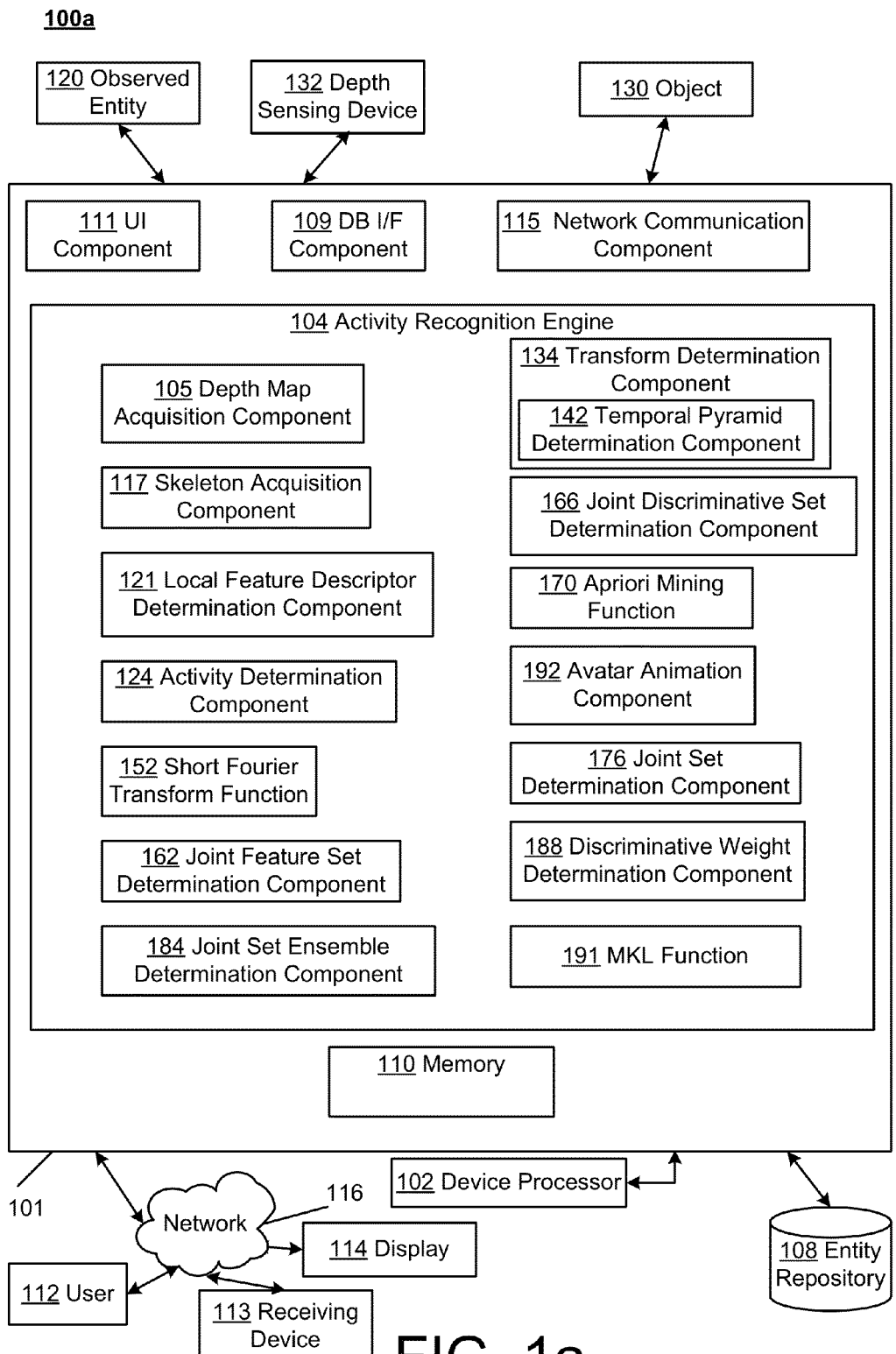
FIGS. 1a-1b are block diagrams illustrating of an example system for action recognition based on depth maps.

Recognition of activities of various entities may be accomplished via sensing devices such as cameras, scanners, and other devices configured to obtain data related to positions of the entities and other objects over time. Recent developments in depth sensing devices have provided interesting techniques for observing activities of entities. For example, a depth sensing device may measure "depths," or distances from the sensing device to observed points on observed entities. For a particular temporal interval (e.g., a time frame), a "depth map" may provide a plurality of pixel values for an observed scene, such that each pixel value indicates a distance from the sensing device to an observed point in the scene. For example, if a depth sensor observed a cup on a table, a resulting depth map for a particular time frame may include pixels having a high intensity value (e.g., one) associated with the areas represented by the cup and table, and low intensity (e.g., zero) values for areas representing the space surrounding the cup and table.

In action recognition, actions may be represented as spatio-temporal patterns. Thus, recognition may involve determining representations of suitable spatio-temporal features, and modeling of dynamical patterns. As discussed further herein, three-dimensional (3D) joint features and local occupancy patterns (discussed below) may be used to represent actions, and these example features may be used to characterize motions of observed entities, as well as interactions between the observed entities and other objects.

Depth maps may be obtained via many different types of sensors. For example, a KINECT depth sensing device may be used, as well as various types of scanners, laser devices, and stereo camera systems. Depth cameras may provide 3D depth data of an observed scene, which may ease difficulties in object segmentation. For example, J. Shotton, et al., "Real-Time Human Pose Recognition in Parts from a Single Depth Image," *In IEEE Computer Vision and Pattern Recognition* (CVPR) 2011, pp. 1297-1304, provides an example human motion capturing technique that may output 3D joint positions of human bodies.

Currently, depth maps captured by some depth cameras may be noisy. Further, three-dimensional (3D) positions of tracked joints may be inaccurate if occlusions occur (e.g., one leg in front of the other, a hand touching another body part, two hands crossing), which may increase intra-class variations in observed actions. In addition, the 3D skeleton motion alone may not suffice to distinguish some actions. For example, "drinking" and "eating snacks" may involve similar motion for the human skeleton. Extra inputs may be included and exploited for better recognition.

Example techniques discussed herein may recognize actions of various entities based on analyzing obtained skeleton representations and depth maps over time. For example, based on the depth data (e.g., from one or more depth sensing devices such as depth cameras) and the estimated 3D joint positions (e.g., as referenced above), local occupancy pattern (LOP) features may be determined. For example, each 3D joint may be associated with a LOP feature, which may be treated as the "depth appearance" of the 3D joint. For example, this feature may be translational invariant and substantially discriminative, and may also capture the relationships between body parts and environmental objects in interactions.

Further, techniques discussed herein may utilize a temporal transform pyramid approach (e.g., using Fourier transforms) to preserve temporal ordering of processed information. For example, a temporal pattern representation (which may be referred to herein as "Fourier Temporal Pyramid") may be used to represent the temporal structure of an individual joint in an action. This example representation may be insensitive to temporal sequence misalignment and may be robust to noise.

Further, example techniques discussed herein may provide an actionlet ensemble model that may be learned to represent each action and to represent intra-class variance. The articulated human body has a large number of kinematic joints, but a particular action is usually associated with and characterized by the interactions and combinations of a small subset of the joints. For example, the joints "right wrist" and "head" may be discriminative for the action "drinking."

Example techniques discussed herein may provide "actionlets" which may be determined as particular conjunctions of the features for respective subsets of the joints, indicating a structure of the features. As there may exist substantial numbers of possible actionlets, example data mining techniques discussed herein may discover discriminative actionlets. Thus, for example, an action may be represented as an actionlet ensemble, which may be determined as a linear combination of the actionlets, and their discriminative weights may be learned via a multiple kernel learning (MKL) method. This type of model may be robust to errors in the features, and may advantageously characterize the intraclass variations in the actions. For example, for the action "call cellphone," some humans may use their right hands while others may use their left hands. This type of variation may be characterized by the example actionlet ensemble model discussed herein.

Further example features that may be suitable for depth data are discussed herein, which are robust to noise, invariant to translational and temporal misalignments, and capable of characterizing both entity motion and entity-object interactions (e.g., human motion and human-object interactions).

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 1B:
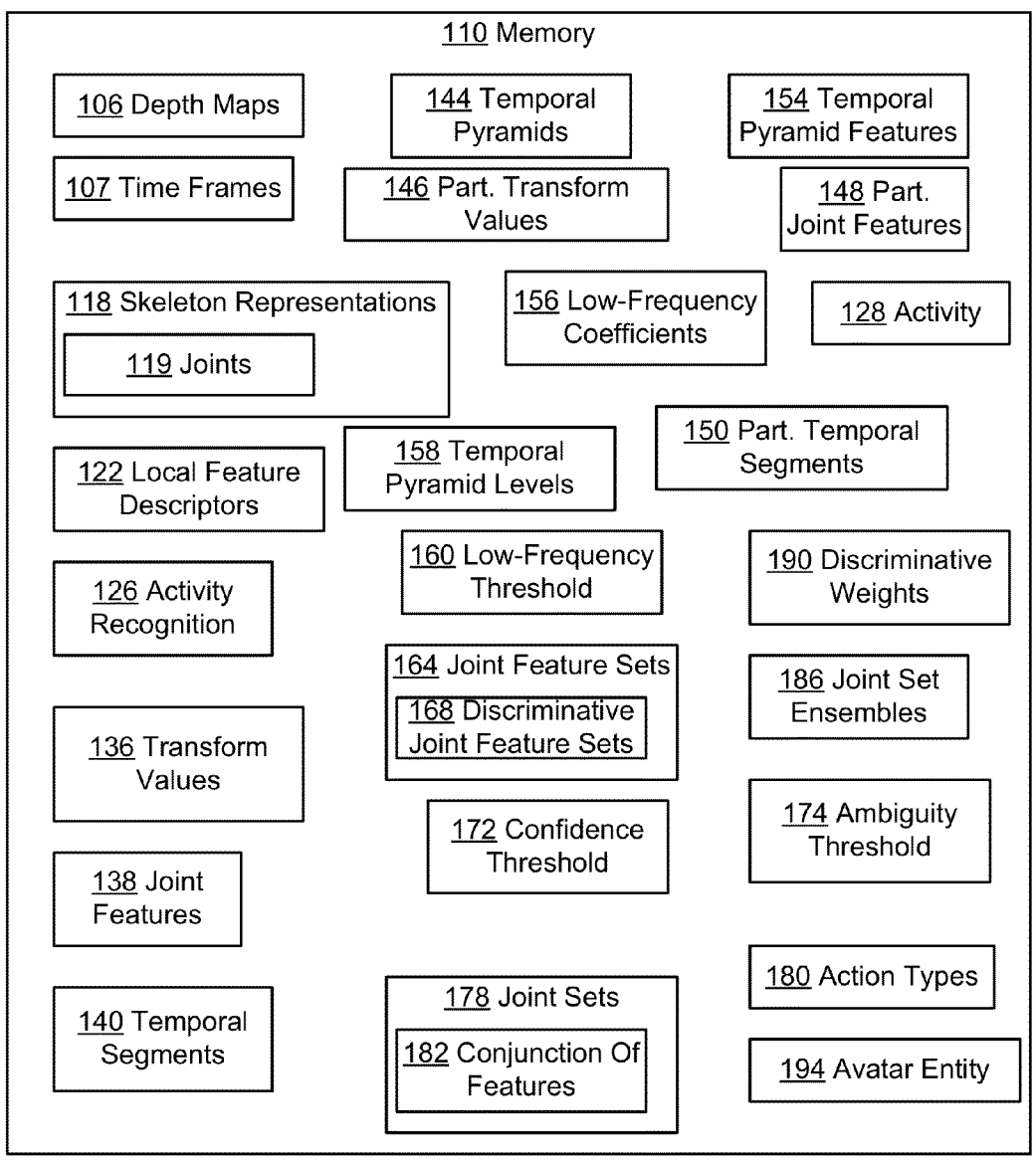

As further discussed herein, FIG. 1 is a block diagram of a system 100 for action recognition based on depth maps. As shown in FIGS. 1*a*-1*b*, a system 100 may include a device 101 that includes at least one processor 102. The device 101 may include an activity recognition engine 104 that may include a depth map acquisition component 105 that may be configured to obtain a plurality of depth maps 106 corresponding to respective depth measurements determined over a respective plurality of time frames 107.

For example, the depth maps 106 may be obtained via many different types of sensors. For example, a KINECT depth sensing device may be used, as well as various types of scanners, laser devices, and stereo camera systems.

According to an example embodiment, the activity recognition engine 104, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 102 is depicted as external to the activity recognition engine 104 in FIG. 1, one skilled in the art of data processing will appreciate that the device processor 102 may be implemented as a single component, and/or as distributed units which may be located internally or externally to the activity recognition engine 104, and/or any of its elements.

For example, the system 100 may include one or more processors 102. For example, the system 100 may include at least one tangible computer-readable storage medium storing instructions executable by the one or more processors 102, the executable instructions configured to cause at least one data processing apparatus to perform operations associated with various example components included in the system 100, as discussed herein. For example, the one or more processors 102 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

According to an example embodiment, the activity recognition engine 104 may be implemented in association with one or more user devices. For example, the activity recognition engine 104 may communicate with a server, as discussed further below.

For example, an entity repository 108 may include one or more databases, and may be accessed via a database interface component 109. One skilled in the art of data processing will appreciate that there are many techniques for storing repository information discussed herein, such as various types of database configurations (e.g., relational databases, hierarchical databases, distributed databases) and non-database configurations.

According to an example embodiment, the activity recognition engine 104 may include a memory 110 that may store the depth maps 106. In this context, a "memory" may include a single memory device or multiple memory devices configured to store data and/or instructions. Further, the memory 110 may span multiple distributed storage devices. The memory 110 is shown in FIG. 1a as a block, and is shown with more detail in FIG. 1b.

According to an example embodiment, a user interface component 111 may manage communications between a user 112 and the activity recognition engine 104. The user 112 may be associated with a receiving device 113 that may be associated with a display 114 and other input/output devices. For example, the display 114 may be configured to communicate with the receiving device 113, via internal device bus communications, or via at least one network connection.

According to example embodiments, the display 114 may be implemented as a flat screen display, a print form of display, a two-dimensional display, a three-dimensional display, a static display, a moving display, sensory displays such as tactile output, audio output, and any other form of output for communicating with a user (e.g., the user 112).

According to an example embodiment, the activity recognition engine 104 may include a network communication component 115 that may manage network communication between the activity recognition engine 104 and other entities that may communicate with the activity recognition engine 104 via at least one network 116. For example, the network 116 may include at least one of the Internet, at least one wireless network, or at least one wired network. For example, the network 116 may include a cellular network, a radio network, or any type of network that may support transmission of data for the activity recognition engine 104. For example, the network communication component 115 may manage network communications between the activity recognition engine 104 and the receiving device 113. For example, the network communication component 115 may manage network communication between the user interface component 111 and the receiving device 113.

A skeleton acquisition component 117 may be configured to obtain a plurality of skeleton representations 118 respectively corresponding to the respective time frames 107. Each skeleton representation 118 may include at least one joint 119 associated with an observed entity 120.

For example, 3D joint positions may be employed to shape the motion of a human body (or other moving entity). For example, representing human movement (or other entity movement) as the pairwise relative positions of the joints may provide substantially discriminative features.

For example, for a human subject, 20 joint positions may be tracked (e.g., the MOTION CAPTURE system captures 30 joints) by an example skeleton tracker, as discussed in J. Shotton, et al., "Real-Time Human Pose Recognition in Parts from a Single Depth Image," *In IEEE Computer Vision and Pattern Recognition* (CVPR) 2011, pp. 1297-1304, and each joint i may have 3 coordinates $p_i(t)=(x_i(t), y_i(t), z_i(t))$ at a time frame t. The coordinates may be normalized so that the motion is invariant to the body position, the initial body orientation and the body size.

For example, for each joint i, the pairwise relative position features may be determined by taking the difference between the position of joint i and that of each other joint j, determined as shown in Equation 1:

$$p_{ij} = p_i - p_j \qquad (1)$$

For example, a 3D "joint feature" for joint i may be determined as:

$$p_i = \{p_{ij} | i \neq j\}. \qquad (2)$$

After enumerating the joint pairs, it may be possible to select the joints that may be considered substantially relevant to recognition techniques. For example, the selection may be accomplished via an example actionlet mining technique, as discussed further below.

For example, representing the entity motion as the relative joint positions may provide substantially discriminative and intuitive features. For example, the action "waving" may be generally interpreted as "arms above the shoulder and move left and right." Such an action may be represented via the pairwise relative positions.

However, it may be insufficient to use no more than 3D joint positions to model an action, as the action may include interactions between the observed entity and other objects. Thus, an example feature may describe a "depth appearance" for the joints 119, as discussed below.

A local feature descriptor determination component 121 may be configured to determine local feature descriptors 122 corresponding to the respective time frames 107, based on the depth maps 106 and the joints 119 associated with the skeleton representations 118.

In accordance with example techniques discussed herein, the interaction between the observed entity 120 and other environmental objects may be represented as the local feature descriptors 122 at each joint 119. For example, a person may be drinking a cup of water. When the person fetches the cup, the space around his/her hand is occupied by the cup. Afterwards, when the person lifts the cup to his/her mouth, the space around both the hand and the head is occupied. For example, the local feature descriptors 122 may include local occupancy (LOP) patterns, as discussed further herein.

Such information may be useful in characterizing this interaction and in differentiating the drinking action from other actions.

For example, in each temporal frame, as discussed further below, a local feature may determine the information based on a 3D point "cloud" (e.g., a set of spatial points in substantially close proximity to the joint, based on a predetermined threshold value) around a particular joint, so that the temporal dynamics of all such patterns may roughly discriminate different types of interactions. For example, FIG. 2 illustrates an example skeleton representation with local occupancy patterns (e.g., there may be local occupancy patterns for each joint 119).

Figure 2:
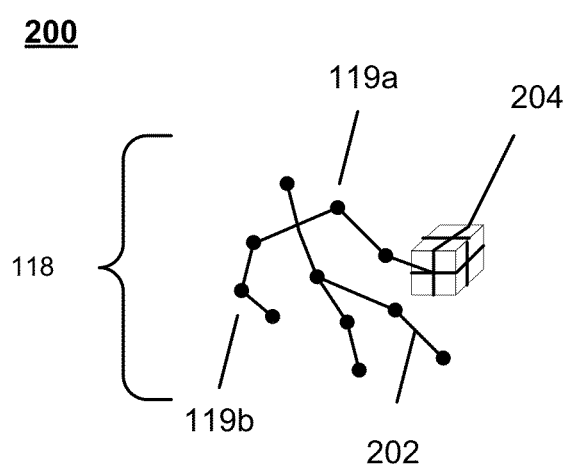
FIG. 2 illustrates an example skeleton representation with local occupancy patterns.

As shown in FIG. 2, a skeleton representation 118 may include joints (e.g., joints 119a, 119b) and pairwise linkages (e.g., pairwise linkage 202). For example, at temporal frame t, a point cloud 204 may be generated from the depth map of frame t. For each joint j, its local region may be partitioned into a $N_x \times N_y \times N_z$ spatial grid. Each bin of the grid may have size $(S_x, S_y, S_z)$ pixels. For example, if $(N_x, N_y, N_z)=(12, 12, 4)$ and $(S_x, S_y, S_z)=(6, 6, 80)$, the local (96, 96, 320) region around a joint may be partitioned into 12×12×4 bins, and the size of each bin may be (6,6,80).

For example, the number of points at a current frame that fall into each bin $b_{xyz}$ of the grid may be counted, and a sigmoid normalization function may be applied to obtain a feature $o_{xyz}$ for this bin. For example, the local occupancy information of this bin may be determined as:

$$o_{xyz} = \delta(\Sigma_{q \in bin_{xyz}} I_q) \quad (3)$$

wherein $I_q=1$ if the point cloud has a point in the location q and $I_q=0$ otherwise. For example, $\delta(.)$ may include a sigmoid normalization function:

$$\delta(x) = \frac{1}{1+e^{-\beta x}}. \quad (4)$$

For example, the LOP feature of a joint i may be determined as a vector that includes the feature $o_{xyz}$ of all the bins in the spatial grid around the joint, and may be denoted as $o_i$.

An activity determination component 124 may be configured to determine at least one activity recognition 126 associated with the observed entity 120, based on the obtained skeleton representations 118 and the determined local feature descriptors 122.

For example, determining the activity recognition 126 may include determining a recognition of an activity 128 that is engaged in by a moving entity 120, in association with an object 130, temporally over the respective plurality of time frames 107.

For example, the depth map acquisition component 105 may be configured to obtain the plurality of depth maps 106 from a depth sensing device 132.

Thus, in accordance with example techniques discussed herein, at least two types of features may be determined from each temporal frame t: the 3D joint position features $p_i[t]$, and the joint feature descriptors (e.g., the LOP features $o_i[t]$). One skilled in the art of data processing will understand that there are many other depth-map based local feature descriptors that may be used in accordance with these techniques, without departing from the spirit of the discussion herein.

As discussed further below, an example transform temporal pyramid (e.g., a Fourier temporal pyramid) may be used to represent the temporal dynamics of these frame level features.

When using a current cost-effective depth camera, noisy depth data and temporal misalignment may be experienced. Thus, it may be advantageous to utilize temporal representations that are robust to both the data noise and the temporal misalignment.

For example, it may be advantageous for such temporal features to be a suitable representation of the temporal structure of the actions. For example, one action may include two consecutive sub-actions, such as "bend the body" and "pick up." As discussed below, the temporal pyramid is a descriptive representation that may satisfy these properties.

Figure 3:
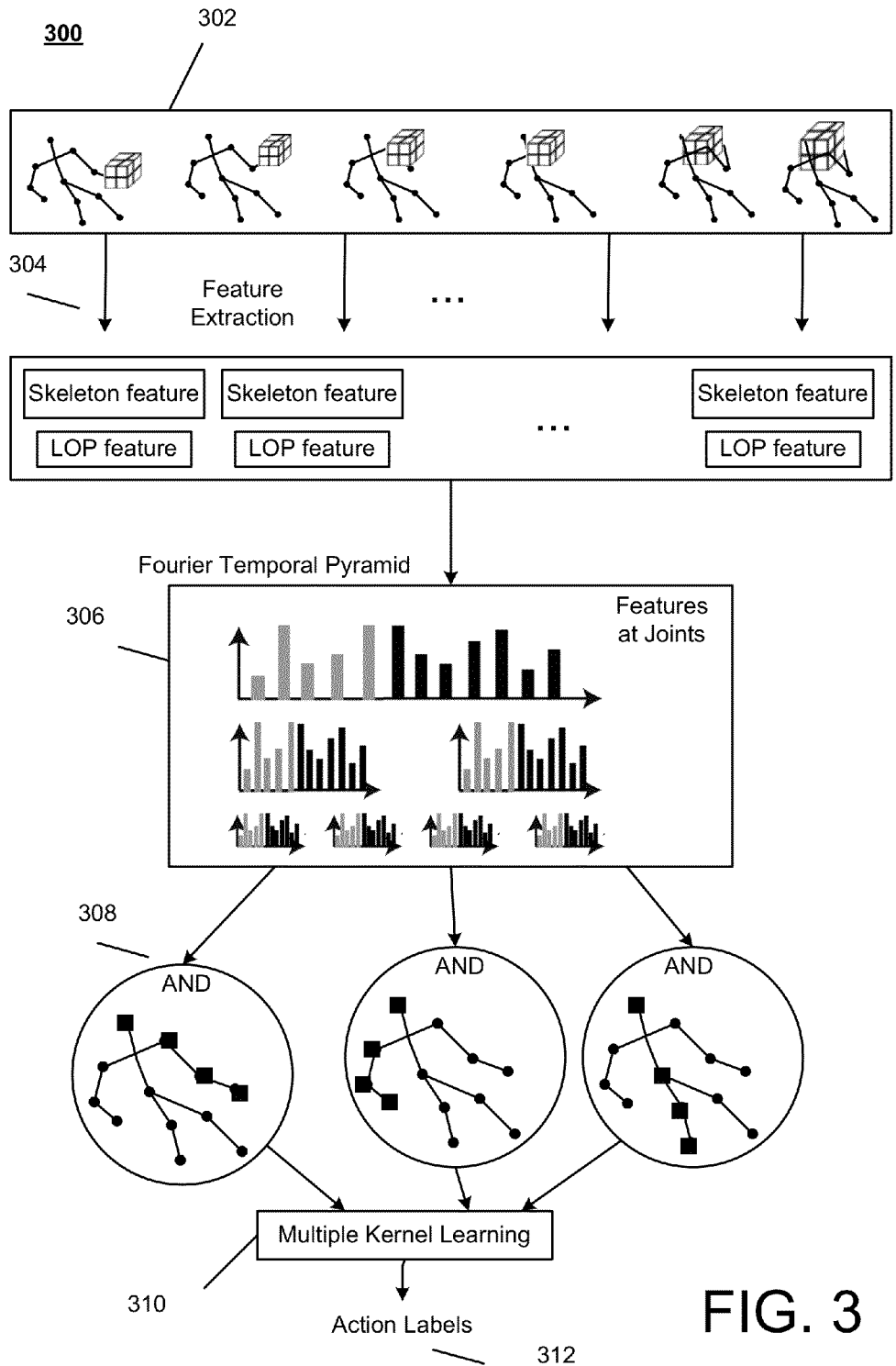
FIG. 3 is a block diagram of an example system for action recognition based on depth maps.
Figure 4:
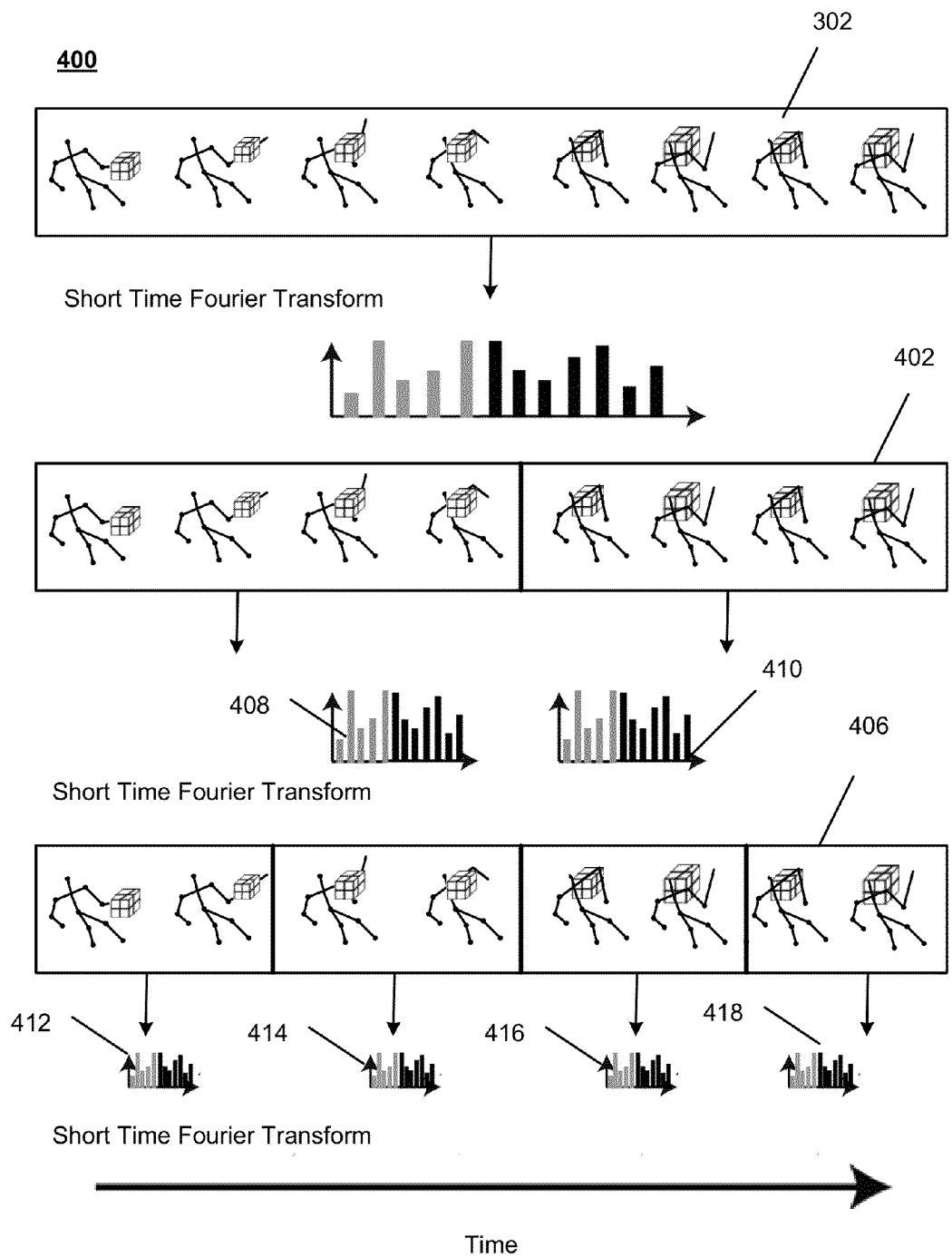
FIG. 4 illustrates example features associated with an example transform temporal pyramid.
Figure 5A:
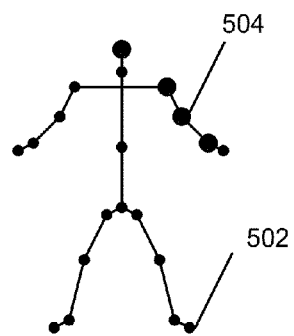
FIGS. 5a-5f illustrate example skeleton representations associated with example mined joint sets.
Figure 5B:
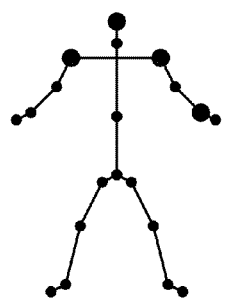
Figure 5C:
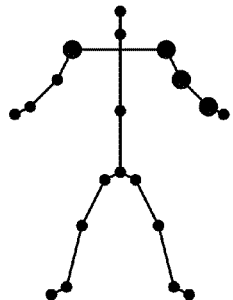
Figure 5D:
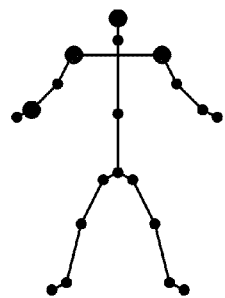
Figure 5E:
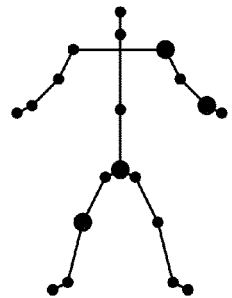
Figure 5F:
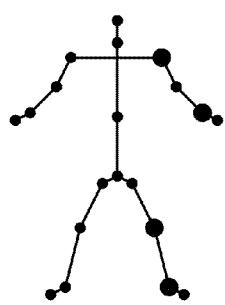

For example, S. Lazebnik, et al., "Beyond bags of features: Spatial pyramid matching for recognizing natural scene categories," *In Proceedings of the* 2006 *IEEE Computer Society Conference on Computer Vision and Pattern Recognition* (Volume 2), pp. 2169-2178, discuss an example Spatial Pyramid approach. In order to capture the temporal structure of the action, in addition to the global Fourier coefficients, example techniques discussed herein may recursively partition the action into a pyramid, and utilize the short time Fourier transform for the partitioned segments, as illustrated in FIGS. 3 and 4 (discussed below). For example, the final feature may include the concatenation of the Fourier coefficients from all the segments. For example, short time Fourier transforms are discussed by A. V. Oppenheim, et al., *Discrete Time Signal Processing,* Prentice Hall Signal Processing Series, Prentice Hall, 1999 (e.g., pp. 714-722).

A transform determination component 134 may be configured to determine transform values 136 of joint features 138 associated with the respective joints 119, based on temporal segments 140. Each temporal segment 140 may include a portion of the plurality of time frames 107.

For example, the transform determination component 134 may include a temporal pyramid determination component 142 configured to determine temporal pyramids 144 based on recursively partitioning the joint features 138 based on recursively partitioning the temporal segments 140, and determining transform values 146 of the partitioned joint features 148 associated with each partitioned temporal segment 150.

For example, the transform determination component 134 may be configured to determine the transform values 136 based on a short Fourier transform function 152.

For example, the transform determination component 134 may be configured to determine temporal pyramid features 154 based on determining low-frequency coefficients 156 associated with the determined transform values 136, at respective levels 158 of the temporal pyramids 144, based on a predetermined low-frequency threshold value 160.

For example, for each joint i, its overall feature vector may be denoted as $g_i = (p_i, o_i)$ where $p_i$ denotes its 3D pairwise position vector and $o_i$ denotes its LOP vector. The dimension of $g_i$ may be denoted as $N_i$ such that $g_i = (g_1, \ldots, g_{N_i})$. As each element $g_j$ is a function of time, it may be denoted as $g_j[t]$. For each time segment at each pyramid level, Short Fourier Transform (e.g., by A. V. Oppenheim, et al., *Discrete Time Signal Processing,* Prentice Hall Signal Processing Series, Prentice Hall, 1999 (e.g., pp. 714-722)) may be applied to element $g_j[t]$ to obtain its Fourier coefficients. For example, the low-frequency coefficients may be used as features. For example, the Fourier Temporal Pyramid feature at joint i may then include the low-frequency coefficients at all levels of the pyramid, and may be denoted as $G_i$.

For example, such a Fourier Temporal Pyramid feature may advantageously discard the high-frequency Fourier coefficients, so that the resulting feature may be robust to noise. For example, this feature may be insensitive to temporal misalignment, because time series with temporal translation have the same (or substantially the same) Fourier coefficient magnitude. Further, for example, the temporal structure of the actions may be characterized by the pyramid structure.

Although the pyramid feature may be robust to noise, example actionlet ensemble (e.g., joint set ensemble) techniques, for representation of the actions, are further discussed below to handle potential errors of the skeleton tracking and for improved characterization of the intra-class variations.

For example, a joint set (e.g., an "actionlet") may be determined as a conjunctive (or AND) structure on the base features. For example, one base feature may be determined as a Fourier Pyramid feature of one joint. For example, it may be desirable that a discriminative joint set (e.g., a discriminative actionlet) may be substantially representative of one action and substantially discriminative compared to other actions. Example data mining techniques for discovering the discriminative joint sets (e.g., discriminative actionlets) are discussed below.

For example, once a set of discriminative actionlets have been mined, a multiple kernel learning technique may be utilized to learn a joint set ensemble (e.g., an actionlet ensemble) structure that combines these discriminative actionlets. For example, O. Chapelle, et al., "Choosing multiple parameters for support vector machines," *Machine*

*Learning*, 46(1):131-159, 2002, discusses example multiple kernel learning (MKL) techniques that may be utilized herein.

For example, a joint feature set determination component 162 may be configured to determine a plurality of joint feature sets 164 of the joints 119 that are associated with a respective plurality of joint features.

For example, a joint discriminative set determination component 166 may be configured to determine discriminative joint feature sets 168 that are included in the plurality of joint feature sets 164, based on an Apriori mining function 170, based on a determination of joint feature sets 164 having a high level of confidence and a low level of ambiguity, based on a predetermined confidence threshold value 172, and a predetermined ambiguity threshold value 174.

For example, a joint set determination component 176 may be configured to determine a plurality of joint sets 178 based on joint features of the joint feature sets 164 associated with subsets of the joints 119. For example, the joint sets 178 may indicate a structure of the joint features included in the joint feature sets 164 associated with the respective subsets of the joints. For example, the joint sets 178 may be associated with a respective plurality of action types 180.

For example, each of the plurality of joint sets 178 may include a conjunction 182 of the joint features for a respective subset of the joints 119, indicating a structure of the joint features for the respective subset of the joints.

For example, a joint set ensemble determination component 184 may be configured to determine joint set ensembles 186 based on one or more linear combinations of kernels, wherein each of the kernels corresponds to one of the determined joint sets 178. For example, the kernels may represent distances between samples of images of entities engaging in particular activities. For example, video samples may be obtained for multiple entities engaging in various activities (e.g., "eating," drinking,"throwing"). Distances between the samples (e.g., samples for "eating") may be determined as distances between feature vectors based on transformations of the feature vectors.

For example, a discriminative weight determination component 188 may be configured to determine discriminative weights 190 associated with each of the determined joint sets 186. For example, the wherein the joint set ensembles 186 may be determined based on a multiple kernel learning (MKL) function 191, based on a convex combination of the kernels.

An actionlet, or joint set 186, may be denoted as a subset of joints $S \subseteq \{1, 2, \ldots, N_j\}$, where $N_j$ denotes the total number of joints 119. For example, training pairs may be denoted as $(x^{(j)}, t^{(j)})$. In order to determine how discriminative each individual joint is, a Support Vector Machine (SVM) model may be trained on feature $G_i$ of each joint i. For each training sample $x^{(j)}$ and the Support Vector Machine (SVM) model on the joint i, the probability that its classification label $y^{(j)}$ is equal to an action class c may be denoted as $P_i(y^{(j)}=c|x^{(j)})$, which may be estimated from the pairwise probabilities by using an example pairwise coupling approach (e.g., as discussed in T. F. Wu, et al., "Probability Estimates for Multi-class Classification by Pairwise Coupling," *Journal of Machine Learning Research*, Vol. 5, pp. 975-1005, 2004).

Since an actionlet utilizes a conjunctive operation, it predicts $y^{(j)}=c$ if and only if every joint $i \in S$ predicts $y^{(j)}=c$. Thus, assuming the joints are independent, the probability that the predicted label $y^{(j)}$ is equal to an action class c given an example $x^{(j)}$ for an actionlet S may be determined as:

$$P_S(y^{(j)}=c|x^{(j)})=\Pi_{i \in S} P_i(y^{(j)}=c|x^{(j)}) \quad (5)$$

For example, $X_c$ may be denoted as $\{j: t^{(j)}=c\}$. For an actionlet to be discriminative, the probability $P_S(y^{(j)}=c|x^{(j)})$ may be large for some data in $X_c$, and may be small for all the data that does not belong to $X_c$. For example, a confidence for actionlet S may be denoted as:

$$\text{Conf}_S = \max_{j \in X_C} \log P_S(y^{(j)}=c|x^{(j)}) \quad (6)$$

and the ambiguity for actionlet S may be denoted as:

$$\text{Amb}_S = \Sigma_{j \notin X_C} \log P_S(y^{(j)}=c|x^{(j)}) \quad (7)$$

It may be desirable for a discriminative actionlet to have large confidence $\text{Conf}_S$ and small ambiguity $\text{Amb}_S$. An actionlet S may be referred to herein as an l-actionlet if its cardinality $|S|=l$. For example, it may be desirable that if a joint $i \notin S$ is added to an (l–1)-actionlet S to generate an l-actionlet $S \cup \{i\}$, a result is that $\text{Conf}_{S \cup \{i\}} \leq \text{Conf}_S$, i.e., adding a new joint into one actionlet will reduce the confidence. As a result, an example Apriori mining technique, for example, similarly as discussed by R. Agrawal et al., "Fast algorithms for mining association rules," *In Proceedings of the 20th International Conference on Very Large Data Bases,* (VLDB, 1994), pages 487-499, may be applied to select the actionlets with large $\text{Conf}_S$ and small $\text{Amb}_S$. If $\text{Conf}_S$ is less than the threshold, it may be possible to avoid considering any S' with $S' \supset S$.

For example, Algorithm 1 below illustrates an example of discriminative actionlet mining. For each class c, the example mining algorithm outputs a discriminative actionlet pool $P_c$ which includes the actionlets that meet the criteria: $\text{Amb}_S \leq T_{amb}$ and $\text{Conf}_S \geq T_{conf}$.

Algorithm 1
Discriminative Actionlet Mining

| | |
|---|---|
| 1 | Obtain the set of joints, the feature $G_i$ on each joint i, the number of the classes C, thresholds $T_{conf}$ and $T_{amb}$. |
| 2 | Train the base classifier on the features $G_i$ of each joint i. |
| 3 | for Class c = 1 to C do |
| 4 | Set $P_c$, the discriminative actionlet pool for class c to be empty : $P_c = \{\ \}$. Set l = 1. |
| 5 | repeat |
| 6 | Generate the l-actionlets by adding one joint into each (l – 1)-actionlet in the discriminative actionlet pool $P_c$. |
| 7 | Add the l-actionlets whose confidences are larger than $T_{conf}$ to the pool $P_c$. |
| 8 | l = l + 1 |
| 9 | until no discriminative actionlet is added to $P_c$ in this iteration; |
| 10 | remove the actionlets whose ambiguities are larger than $T_{amb}$ in the pool $P_c$. |
| 11 | end |
| 12 | return the discriminative actionlet pool for all the classes |

For each actionlet $S_k$ in the discriminative actionlet pool, an example SVM model on it may define a joint feature map $\Phi_k(x, y)$ on data X and labels Y as a linear output function $f_k(x, y) = \langle w_k, \Phi_k(x, y) \rangle + b_k$, parameterized with the hyperplane normal $w_k$k and bias $b_k$. The predicted class y for x may be chosen to maximize the output $f_k(x, y)$.

For example, Multiclass-MKL may consider a convex combination of p kernels, $K(x_i, x_j) = \Sigma_{k=1}^{P} \beta_k K_k(x_i, x_j)$, where each kernel corresponds to an actionlet, or joint set. Equivalently, an example output function may be denoted as:

$$f_{final}(x,y) = \Sigma_{k=1}^{P} [\beta_k \langle w_k, \Phi_k(x,y) \rangle + b_k] \quad (8)$$

For example, it may be desirable to choose $w=(w_k)$, $b=(b_k)$, $\beta=(\beta_k)$, $k=1, \ldots, p$, such that given any training data pair $(x^{(i)}, y^{(i)})$, $f_{final}(x^{(i)}, y^{(i)}) \geq f_{final}(x^{(i)}, u)$ for all $u \in Y - \{y^{(i)}\}$. The resulting optimization problem may then become:

$$\min_{\beta,w,b,\xi} \frac{1}{2}\Omega(\beta) + C\sum_{i=1}^{n}\xi_i \quad (9)$$

$$\text{s.t. } \forall\ i{:}\xi_i = \max_{u\ne y_i} l(f_{\text{final}}(x^{(i)}, y^{(i)}) - f_{\text{final}}(x^{(i)}, u))$$

where C is the regularization parameter and l is a convex loss function, and $\Omega(\beta)$ is a regularization parameter on the $\beta$. Following an example technique in J. H. Friedman et al., "Predictive learning via rule ensembles," *The Annals of Applied Statistics*, 2(3): 916-954, September 2008, a selection may be made of $\Omega(\beta)=\|\beta\|_1^2$ to encourage a sparse $\beta$, so that an ensemble of a small number of actionlets may be learned.

For example, this problem may be solved by iteratively optimizing $\beta$ with fixed w and b through linear programming, and optimizing w and b with fixed $\beta$ through a generic SVM solver such as LIBSVM (e.g., as discussed by Chih-Chung Chang et al., "LIBSVM: A Library for Support Vector Machines," *ACM Transactions on Intelligent Systems and Technology* (TIST) Vol. 2 Issue 3, Article No. 27, April 2011).

For example, an avatar animation component 192 may be configured to initiate animation of at least one avatar entity 194, based on the determined activity recognition 126 associated with the observed entity 120.

In this context, an "avatar" may include a representation (e.g. a graphical representation) of a user or a user's alter ego or character. For example, it may include a three-dimensional form, as in games or virtual worlds, or a two-dimensional form as an icon in Internet forums and other online communities.

For example, activities may include human activities such as drink, eat, read book, call cellphone, write on a paper, use laptop, use vacuum cleaner, cheer up, sit still, toss paper, play game, lay down on sofa, walk, run, play guitar, stand up, sit down. For example, observed entities may perform activities in various poses, such as "sitting on sofa" or "standing."

For example, each one of the plurality of depth maps 106 may include a plurality of pixel values. For example, each of the pixel values may represent a distance between an observing device and an observed point included in a respective observed scene, the respective observed scenes temporally observed during each respective time frame 107.

For example, the skeleton representations 118 may represent skeleton attributes associated with the observed entity 120. For example, each of the skeleton representations 118 may include a plurality of joints 119 and pairwise linkages between pairs of at least a portion of the plurality of joints 119. For example, the skeleton representations 118 may represent temporal skeletal outlines, including joint positions, that are associated with the observed entity 120, during each respective time frame 107.

For example, each of the local occupancy patterns may represent a respective three-dimensional (3D) space occupancy pattern that is local to one of the joints 119, corresponding to the respective time frames 107, based on the depth maps 106 and the joints 119 associated with the skeleton representations 118. For example, the local feature descriptor determination component 121 may be configured to determine each local occupancy pattern 122 based on a predetermined threshold value representing a bound of a respective point cloud (e.g., a set of points) that represents a respective locality of each respective joint 119 associated with the skeleton representations 118.

FIG. 3 is a block diagram of an example system for action recognition based on depth maps. As shown in FIG. 3, a plurality of skeleton representations 302 representing an observed entity over time may be obtained. The skeleton features and LOP features may be extracted (304), and a temporal pyramid 306 may be determined, based on Fourier transforms. A conjunctive operation may be applied to the processed features at 308. A MKL technique 310 may be applied to the features to obtain action labels 312.

FIG. 4 illustrates example features associated with an example transform temporal pyramid. As shown in FIG. 4, the plurality of skeleton representations 302 may be recursively partitioned (402, 406), and short Fourier transforms 408, 410, 412, 414, 416, 418 may be obtained. For example, the transforms 412, 414, 416, 418 may be concatenated together for a temporal order-preserving representation.

As shown in FIG. 4, lighter areas of the transforms 408, 410, 412, 414, 416, 418 may indicate values associated with the corresponding skeleton features, and darker areas may indicate values associated with the LOP features.

FIG. 5 illustrates example skeleton representations associated with example mined joint sets (e.g., actionlets). As shown in FIG. 5, smaller dots (e.g., dot 502) may represent joints on skeletons, while larger dots (e.g., dot 504) may indicate a discriminative joint. As shown, in FIGS. 5a and 5b depict actionlets for "drink." FIGS. 5c and 5d depict actionlets "call." FIGS. 5e and 5f depict actionlets for "walk."

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

FIG. 6 is a flowchart illustrating example operations of the system of FIG. 1, according to example embodiments. In the example of FIG. 6a, a plurality of depth maps corresponding to respective depth measurements determined over a respective plurality of time frames may be obtained (602). For example, the depth map acquisition component 105 may obtain the depth maps 106 corresponding to respective depth measurements determined over a respective plurality of time frames 107, as discussed above.

A plurality of skeleton representations respectively corresponding to the respective time frames may be obtained. Each skeleton representation may include at least one joint associated with an observed entity (604). For example, the skeleton acquisition component 117 may obtain the skeleton representations 118 respectively corresponding to the respective time frames 107, as discussed above.

Local feature descriptors corresponding to the respective time frames may be determined, based on the depth maps and the joints associated with the skeleton representations (606). For example, the local feature descriptor determination component 121 may obtain the local feature descriptors 122, as discussed above.

At least one activity recognition associated with the observed entity may be determined, based on the obtained skeleton representations and the determined local feature descriptors (608). For example, the activity determination component 124 may determine at least one activity recognition 126 associated with the observed entity 120, as discussed above.

For example, determining the at least one activity recognition may include determining a recognition of an activity that is engaged in by a moving entity, in association with an object, temporally over the respective plurality of time frames (610). For example, the depth maps may be obtained from a depth sensing device (612). For example, the depth map acquisition component 105 may obtain the plurality of depth maps 106 from the depth sensing device 132, as discussed above.

Figure 6A:
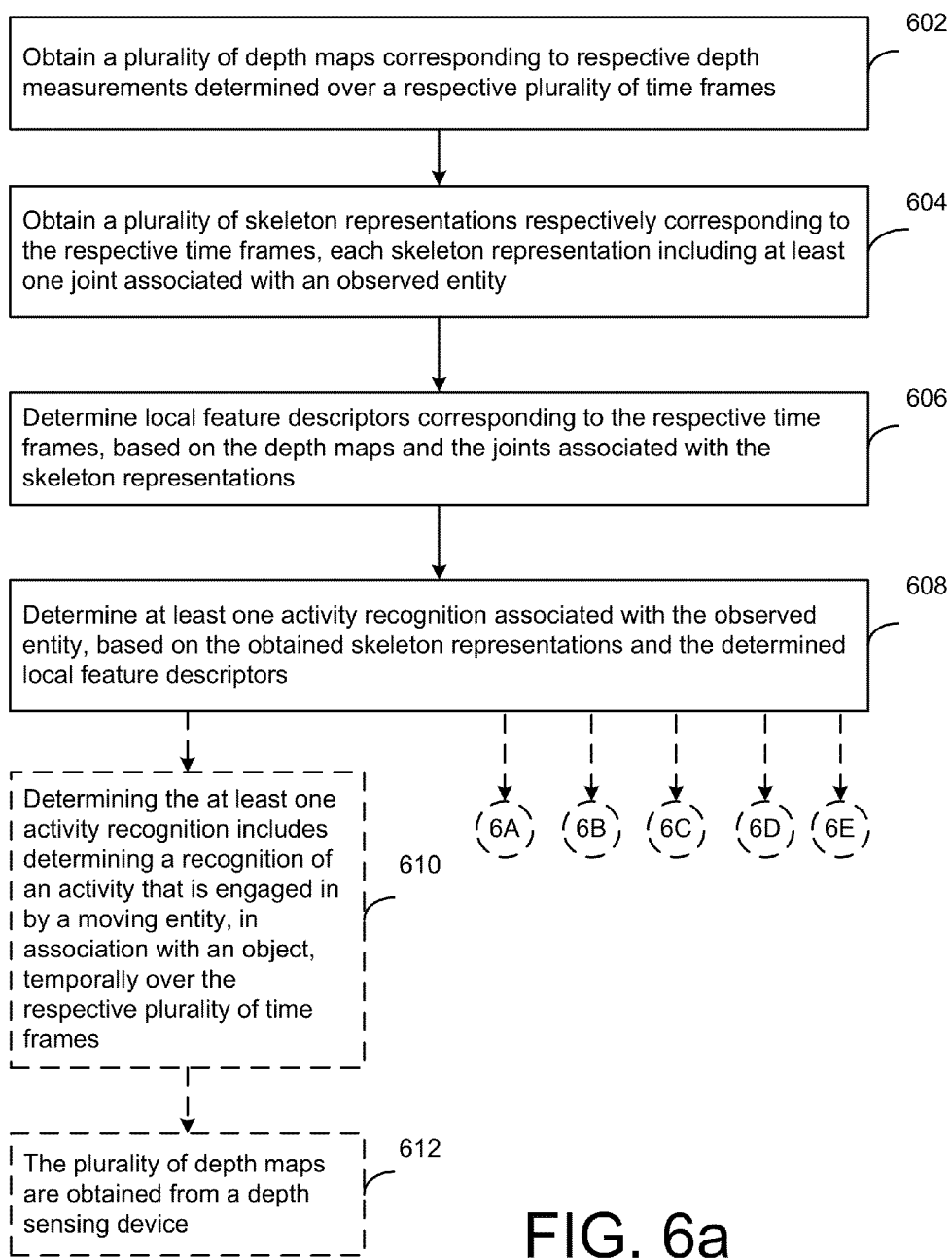
FIGS. 6a-6d are a flowchart illustrating example operations of the system of FIG. 1.
Figure 6B:
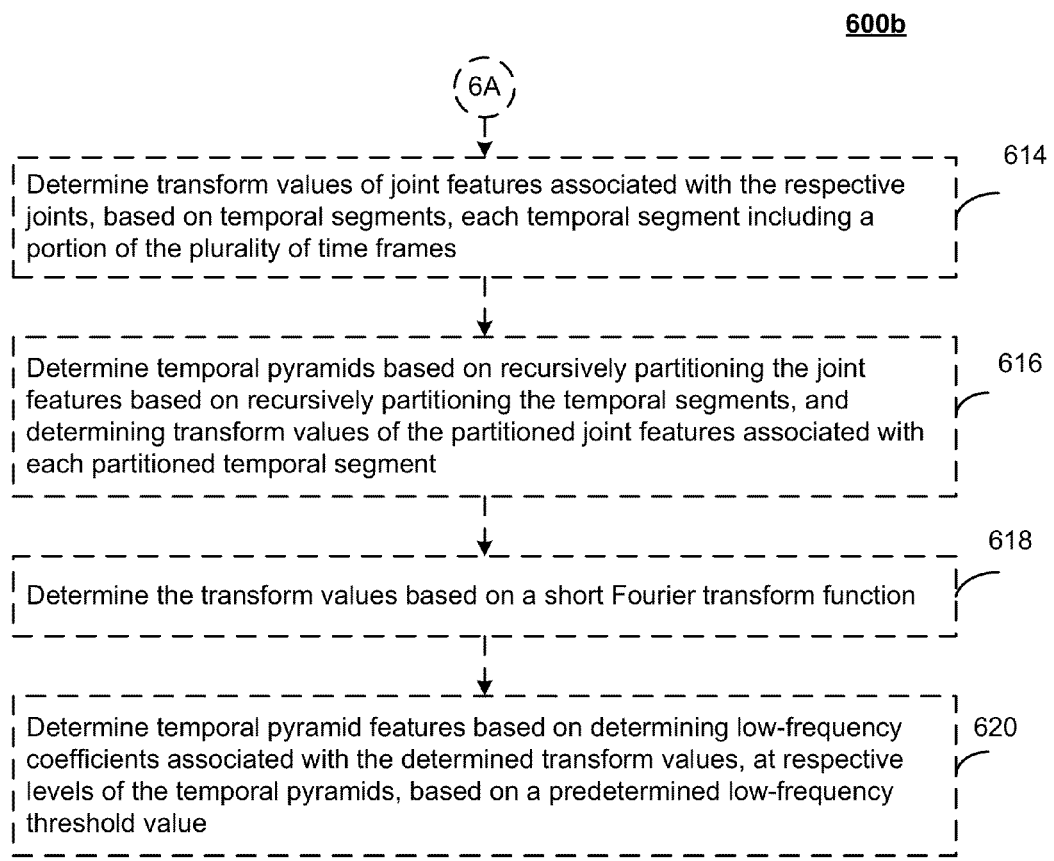

For example, transform values of joint features associated with the respective joints may be determined, based on temporal segments, each temporal segment including a portion of the plurality of time frames (614), in the example of FIG. 6b. For example, the transform determination component 134 may determine transform values 136 of joint features 138 associated with the respective joints 119, based on temporal segments 140, as discussed above.

For example, temporal pyramids may be determined based on recursively partitioning the joint features based on recursively partitioning the temporal segments, and determining transform values of the partitioned joint features associated with each partitioned temporal segment (616). For example, the temporal pyramid determination component 142 may determine temporal pyramids 144 based on recursively partitioning the joint features 138 based on recursively partitioning the temporal segments 140, and determining transform values 146 of the partitioned joint features 148 associated with each partitioned temporal segment 150, as discussed above.

For example, the transform values may be determined based on a short Fourier transform function (618). For example, the transform determination component 134 may determine the transform values 136 based on the short Fourier transform function 152, as discussed above.

For example, temporal pyramid features may be determined based on determining low-frequency coefficients associated with the determined transform values, at respective levels of the temporal pyramids, based on a predetermined low-frequency threshold value (620). For example, the transform determination component 134 may determine temporal pyramid features 154 based on determining low-frequency coefficients 156 associated with the determined transform values 136, at respective levels 158 of the temporal pyramids 144, based on the predetermined low-frequency threshold value 160, as discussed above.

Figure 6C:
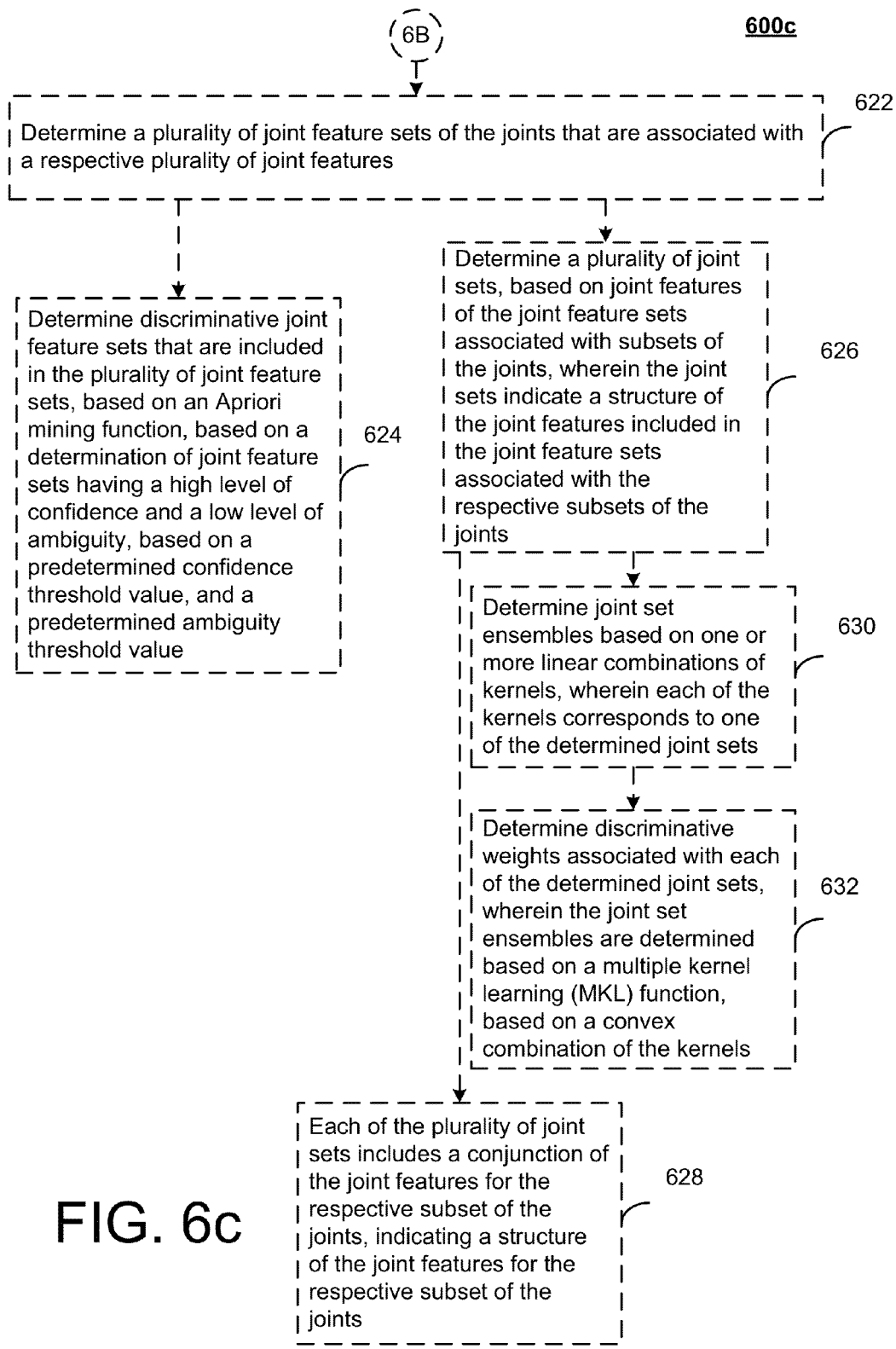

For example, a plurality of joint feature sets of the joints that are associated with a respective plurality of joint features may be determined (622), in the example of FIG. 6c. For example, the joint feature set determination component 162 may determine a plurality of joint feature sets 164 of the joints 119 that are associated with a respective plurality of joint features, as discussed above.

For example, discriminative joint feature sets that are included in the plurality of joint feature sets may be determined, based on an Apriori mining function, based on a determination of joint feature sets having a high level of confidence and a low level of ambiguity, based on a predetermined confidence threshold value, and a predetermined ambiguity threshold value (624). For example, the joint discriminative set determination component 166 may determine discriminative joint feature sets 168 that are included in the plurality of joint feature sets 164, based on an Apriori mining function 170, based on a determination of joint feature sets 164 having a high level of confidence and a low level of ambiguity, based on a predetermined confidence threshold value 172, and a predetermined ambiguity threshold value 174, as discussed above.

For example, a plurality of joint sets may be determined, based on joint features of the joint feature sets associated with subsets of the joints, wherein the joint sets indicate a structure of the joint features included in the joint feature sets associated with the respective subsets of the joints (626). For example, the joint set determination component 176 may determine the joint sets 178, as discussed above.

For example, each of the plurality of joint sets may include a conjunction of the joint features for a respective subset of the joints, indicating a structure of the joint features for the respective subset of the joints (628).

For example, joint set ensembles may be determined based on one or more linear combinations of kernels, wherein each of the kernels corresponds to one of the determined joint sets (630). For example, the joint set ensemble determination component 184 may determine the joint set ensembles 186, as discussed above.

For example, discriminative weights associated with each of the determined joint sets may be determined, wherein the joint set ensembles may be determined based on a multiple kernel learning (MKL) function, based on a convex combination of the kernels (632). For example, the discriminative weight determination component 188 may determine the discriminative weights 190, as discussed above.

Figure 6D:
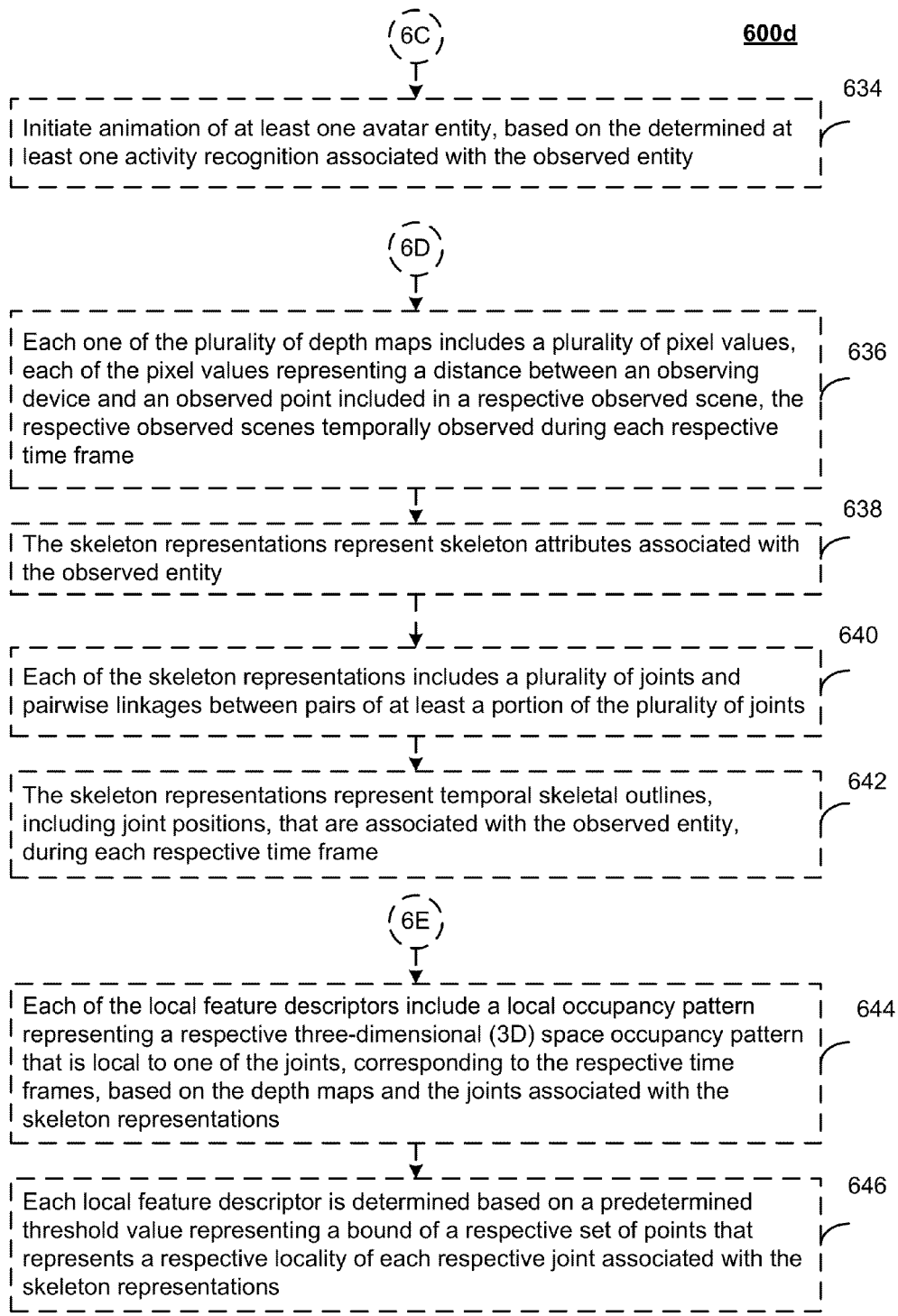

For example, animation of at least one avatar entity may be initiated, based on the determined at least one activity recognition associated with the observed entity (634), in the example of FIG. 6d. For example, the avatar animation component 192 may initiate animation of at least one avatar entity 194, based on the determined activity recognition 126 associated with the observed entity 120, as discussed above.

For example, each one of the plurality of depth maps may include a plurality of pixel values, each of the pixel values representing a distance between an observing device and an observed point included in a respective observed scene, the respective observed scenes temporally observed during each respective time frame (636). For example, the skeleton representations may represent skeleton attributes associated with the observed entity (638).

For example, each of the skeleton representations may include a plurality of joints and pairwise linkages between pairs of at least a portion of the plurality of joints (640). For example, the skeleton representations may represent temporal skeletal outlines, including joint positions, that are associated with the observed entity, during each respective time frame (642).

For example, each of the local feature descriptors may include a local occupancy pattern representing a respective three-dimensional (3D) space occupancy pattern that is local to one of the joints, corresponding to the respective time frames, based on the depth maps and the joints associated with the skeleton representations (644).

For example, each local feature descriptor may be determined based on a predetermined threshold value representing a bound of a respective set of points that represents a respective locality of each respective joint associated with the skeleton representations (646). For example, the local feature descriptor determination component 121 may determine each local feature descriptor 122, as discussed above.

Figure 7A:
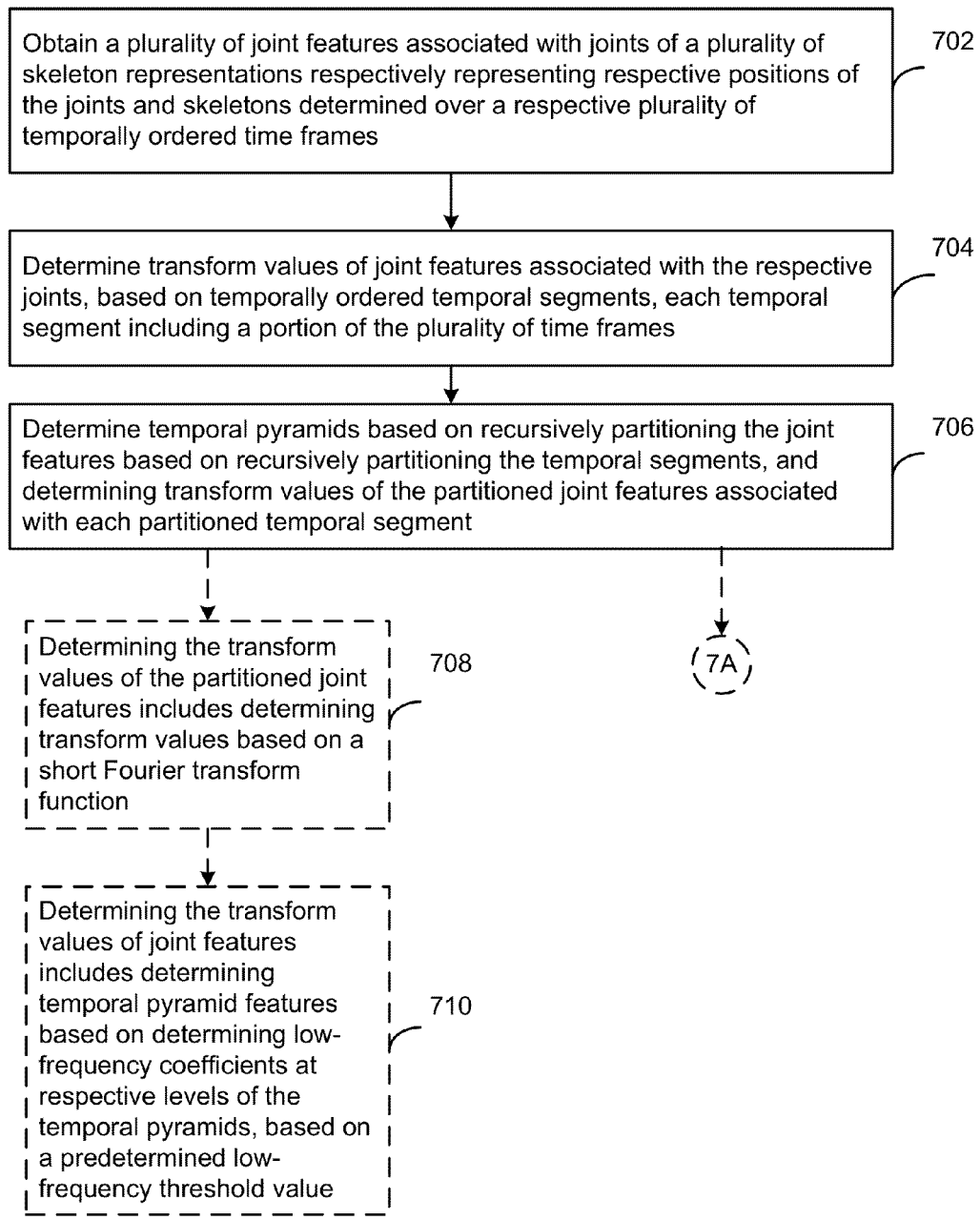

FIG. 7 is a flowchart illustrating example operations of the system of FIG. 1, according to example embodiments. In the example of FIG. 7a, a plurality of joint features associated with joints of a plurality of skeleton representations respectively representing respective positions of the joints and skeletons determined over a respective plurality of temporally ordered time frames may be obtained (702).

Transform values of joint features associated with the respective joints may be determined, based on temporally ordered temporal segments, each temporal segment including a portion of the plurality of time frames (704). For example, the transform determination component 134 may determine transform values 136 of joint features 138 associated with the respective joints 119, based on temporal segments 140, as discussed above.

Temporal pyramids may be determined based on recursively partitioning the joint features based on recursively partitioning the temporal segments, and determining transform values of the partitioned joint features associated with each partitioned temporal segment (706). For example, the temporal pyramid determination component 142 may determine temporal pyramids 144 based on recursively partitioning the joint features 138 based on recursively partitioning the temporal segments 140, and determining transform values 146 of the partitioned joint features 148 associated with each partitioned temporal segment 150, as discussed above.

For example, determining the transform values of the partitioned joint features may include determining transform values based on a short Fourier transform function (708). For example, the transform determination component 134 may determine the transform values 136 based on a short Fourier transform function 152, as discussed above.

For example, determining the transform values of joint features may include determining temporal pyramid features based on determining low-frequency coefficients at respective levels of the temporal pyramids, based on a predetermined low-frequency threshold value (710). For example, the transform determination component 134 may determine temporal pyramid features 154 based on determining low-frequency coefficients 156 associated with the determined transform values 136, at respective levels 158 of the temporal pyramids 144, based on a predetermined low-frequency threshold value 160, as discussed above.

For example, a plurality of depth maps corresponding to respective depth measurements determined over the respective plurality of time frames may be obtained (712), in the example of FIG. 7*b*.

For example, obtaining the plurality of joint features may include obtaining the plurality of skeleton representations respectively corresponding to the respective time frames, each skeleton representation including at least one joint associated with an observed entity (714). For example, pattern features representing points in predetermined proximities to each of the joints, corresponding to the respective time frames may be determined, based on the depth maps and the joints associated with the skeleton representations (716).

At least one activity associated with the observed entity may be determined, based on the obtained skeleton representations, the determined pattern features, and the temporal pyramids (718).

For example, determining the pattern features may include determining pairwise relative positions of the joints associated with the skeleton representations, corresponding to the respective time frames, based on the depth maps and the joints associated with the skeleton representations (720).

For example, determining the pattern features may include partitioning local regions in proximity to each of the joints into respective spatial grids, wherein each respective spatial grid includes a respective plurality of bins that include pixel values, counting a number of occupied points for each respective bin, at each of the respective time frames, based on the depth maps and the joints associated with the skeleton representations, and determining a vector of that includes features associated with the plurality of bins, based on a sigmoid normalization function of the counted numbers (722).

Figure 8:
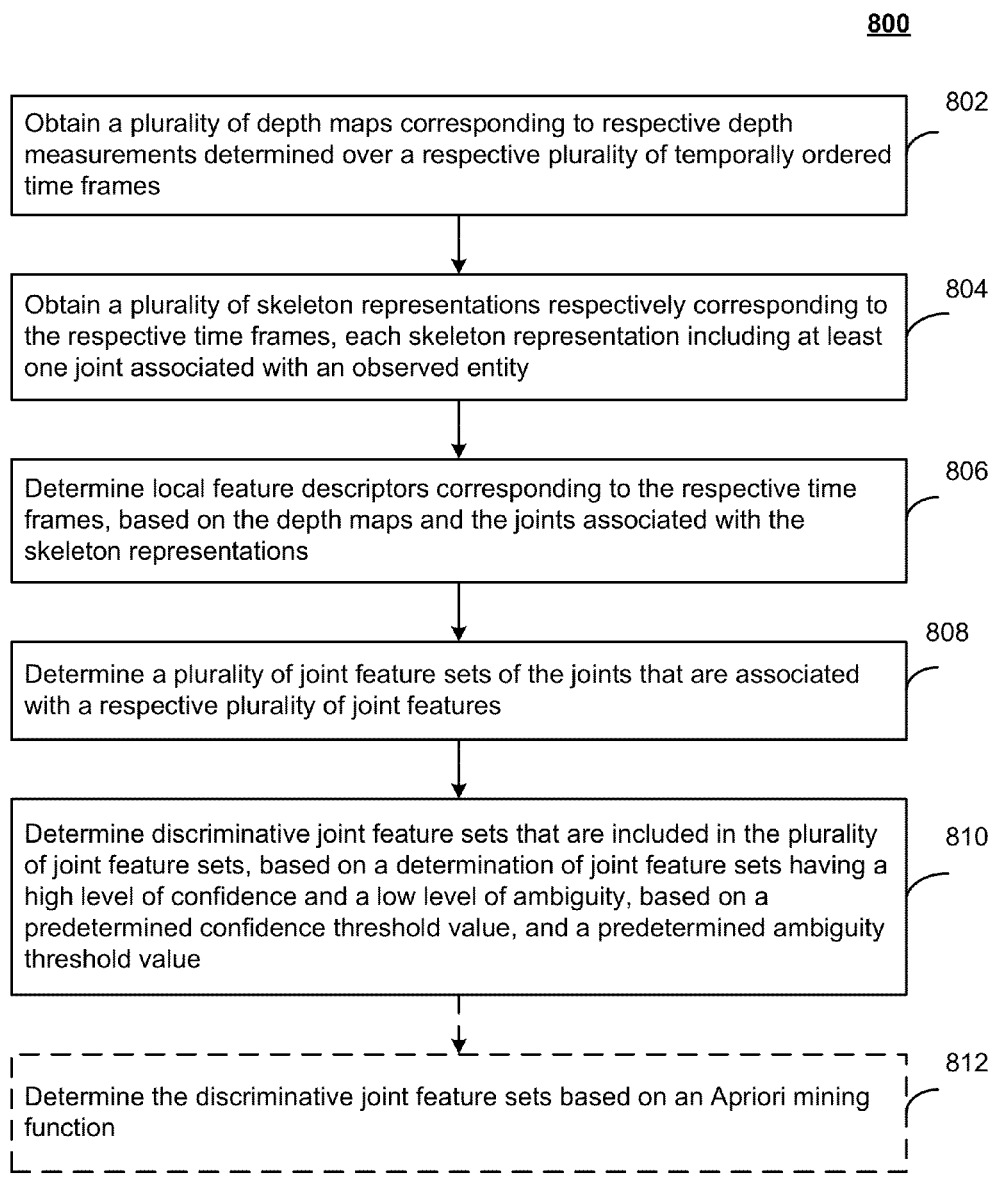
FIG. 8 is a flowchart illustrating example operations of the system of FIG. 1.

FIG. 8 is a flowchart illustrating example operations of the system of FIG. 1, according to example embodiments. In the example of FIG. 8*a*, a plurality of depth maps corresponding to respective depth measurements determined over a respective plurality of temporally ordered time frames may be obtained (802). For example, the depth map acquisition component 105 may obtain the depth maps 106 corresponding to respective depth measurements determined over a respective plurality of time frames 107, as discussed above.

A plurality of skeleton representations respectively corresponding to the respective time frames may be obtained, each skeleton representation including at least one joint associated with an observed entity (804). For example, the skeleton acquisition component 117 may obtain the skeleton representations 118 respectively corresponding to the respective time frames 107, as discussed above.

Local feature descriptors corresponding to the respective time frames may be determined, based on the depth maps and the joints associated with the skeleton representations (806). For example, the local feature descriptor determination component 121 may determine local feature descriptors 122 corresponding to the respective time frames 107, based on the depth maps 106 and the joints 119 associated with the skeleton representations 118, as discussed above.

A plurality of joint feature sets of the joints that are associated with a respective plurality of joint features may be determined (808). For example, the joint feature set determination component 162 may determine the joint feature sets 164 of the joints 119 that are associated with a respective plurality of joint features corresponding to respective joints 119, as discussed above.

Discriminative joint feature sets that are included in the plurality of joint feature sets may be determined, based on a determination of joint feature sets having a high level of confidence and a low level of ambiguity, based on a predetermined confidence threshold value, and a predetermined ambiguity threshold value (810). For example, the joint discriminative set determination component 166 may determine discriminative joint feature sets 168 that are included in the plurality of joint feature sets 164, as discussed above.

For example, the discriminative joint feature sets may be determined based on an Apriori mining function (812), as discussed above.

One skilled in the art of data processing will understand that there are many ways of determining activity based on depth maps, without departing from the spirit of the discussion herein.

Customer privacy and confidentiality have been ongoing considerations in data processing environments for many years. Thus, example techniques for determining activity based on depth maps may use user input and/or data provided by users who have provided permission via one or more subscription agreements (e.g., "Terms of Service" (TOS) agreements) with associated applications or services associated with browsing. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
 a device that includes at least one processor, the device including an activity recognition engine comprising instructions tangibly embodied on a computer readable storage medium for execution by the at least one processor, the activity recognition engine including:
a depth map acquisition component configured to obtain a plurality of depth maps corresponding to respective depth measurements determined over a respective plurality of time frames;
a skeleton acquisition component configured to obtain a plurality of skeleton representations respectively corresponding to the respective time frames, each skeleton representation including at least one joint associated with an observed entity;
a local feature descriptor determination component configured to determine local feature descriptors corresponding to the respective time frames, based on the depth maps and the joints associated with the skeleton representations; and
an activity determination component configured to determine at least one activity recognition associated with the observed entity, based on the obtained skeleton representations and the determined local feature descriptors.

2. The system of claim 1, wherein:
determining the at least one activity recognition includes determining a recognition of an activity that is engaged in by a moving entity, in association with an object, temporally over the respective plurality of time frames, wherein:
the depth map acquisition component is configured to obtain the plurality of depth maps from a depth sensing device.

3. The system of claim 1, further comprising:
a transform determination component configured to determine transform values of joint features associated with the respective joints, based on temporal segments, each temporal segment including a portion of the plurality of time frames.

4. The system of claim 3, wherein:
the transform determination component includes a temporal pyramid determination component configured to determine temporal pyramids based on recursively partitioning the joint features based on recursively partitioning the temporal segments, and determining transform values of the partitioned joint features associated with each partitioned temporal segment, wherein:
the transform determination component is configured to determine the transform values based on a short Fourier transform function, wherein
the transform determination component is configured to determine temporal pyramid features based on determining low-frequency coefficients associated with the determined transform values, at respective levels of the temporal pyramids, based on a predetermined low-frequency threshold value.

5. The system of claim 1, further comprising:
a joint feature set determination component configured to determine a plurality of joint feature sets of the joints that are associated with a respective plurality of joint features.

6. The system of claim 5, further comprising:
a joint discriminative set determination component configured to determine discriminative joint feature sets that are included in the plurality of joint feature sets, based on an Apriori mining function, based on a determination of joint feature sets having a high level of confidence and a low level of ambiguity, based on a predetermined confidence threshold value, and a predetermined ambiguity threshold value.

7. The system of claim 5, further comprising:
a joint set determination component configured to determine a plurality of joint sets based on joint features of the joint feature sets associated with subsets of the joints, wherein the joint sets indicate a structure of the joint features included in the joint feature sets associated with the respective subsets of the joints.

8. The system of claim 7, wherein:
each of the plurality of joint sets includes a conjunction of the joint features for a respective subset of the joints, indicating a structure of the joint features for the respective subset of the joints.

9. The system of claim 7, further comprising:
a joint set ensemble determination component configured to determine joint set ensembles based on one or more linear combinations of kernels, wherein each of the kernels corresponds to one of the determined joint sets.

10. The system of claim 9, further comprising:
a discriminative weight determination component configured to determine discriminative weights associated with each of the determined joint sets, wherein the joint set ensembles are determined based on a multiple kernel learning (MKL) function, based on a convex combination of the kernels.

11. The system of claim 1, further comprising:
an avatar animation component configured to initiate animation of at least one avatar entity, based on the determined at least one activity recognition associated with the observed entity.

12. The system of claim 1, wherein:
each one of the plurality of depth maps includes a plurality of pixel values, each of the pixel values representing a distance between an observing device and an observed point included in a respective observed scene, the respective observed scenes temporally observed during each respective time frame, wherein
the skeleton representations represent skeleton attributes associated with the observed entity, wherein
each of the skeleton representations includes a plurality of joints and pairwise linkages between pairs of at least a portion of the plurality of joints, and wherein
the skeleton representations represent temporal skeletal outlines, including joint positions, that are associated with the observed entity, during each respective time frame.

13. The system of claim 1, wherein:
each of the local feature descriptors includes a local occupancy pattern representing a respective three-dimensional (3D) space occupancy pattern that is local to one of the joints, corresponding to the respective time frames, based on the depth maps and the joints associated with the skeleton representations, wherein
the local feature descriptor determination component is configured to determine each local occupancy pattern based on a predetermined threshold value representing a bound of a respective set of points that represents a respective locality of each respective joint associated with the skeleton representations.

14. A method comprising:
obtaining a plurality of joint features associated with joints of a plurality of skeleton representations respectively representing respective positions of the joints and skeletons determined over a respective plurality of temporally ordered time frames;

determining transform values of joint features associated with the respective joints, based on temporally ordered temporal segments, each temporal segment including a portion of the plurality of time frames;

determining temporal pyramids based on recursively partitioning the joint features based on recursively partitioning the temporal segments, and determining transform values of the partitioned joint features associated with each partitioned temporal segment.

15. The method of claim 14, wherein:

determining the transform values of the partitioned joint features includes determining transform values based on a short Fourier transform function, wherein determining the transform values of joint features includes determining temporal pyramid features based on determining low-frequency coefficients at respective levels of the temporal pyramids, based on a predetermined low-frequency threshold value.

16. The method of claim 14, further comprising:

obtaining a plurality of depth maps corresponding to respective depth measurements determined over the respective plurality of time frames, wherein obtaining the plurality of joint features includes obtaining the plurality of skeleton representations respectively corresponding to the respective time frames, each skeleton representation including at least one joint associated with an observed entity, and determining pattern features representing points in predetermined proximities to each of the joints, corresponding to the respective time frames, based on the depth maps and the joints associated with the skeleton representations, wherein the method further comprises:

determining at least one activity associated with the observed entity, based on the obtained skeleton representations, the determined pattern features, and the temporal pyramids.

17. The method of claim 16, wherein:

determining the pattern features includes determining pairwise relative positions of the joints associated with the skeleton representations, corresponding to the respective time frames, based on the depth maps and the joints associated with the skeleton representations.

18. The method of claim 16, wherein:

determining the pattern features includes:

partitioning local regions in proximity to each of the joints into respective spatial grids, wherein each respective spatial grid includes a respective plurality of bins that include pixel values, counting a number of occupied points for each respective bin, at each of the respective time frames, based on the depth maps and the joints associated with the skeleton representations, and determining a vector of that includes features associated with the plurality of bins, based on a sigmoid normalization function of the counted numbers.

19. A computer program product tangibly embodied on a computer-readable storage medium and including executable code that causes at least one data processing apparatus to:

obtain a plurality of depth maps corresponding to respective depth measurements determined over a respective plurality of temporally ordered time frames;

obtain a plurality of skeleton representations respectively corresponding to the respective time frames, each skeleton representation including at least one joint associated with an observed entity;

determine local feature descriptors corresponding to the respective time frames, based on the depth maps and the joints associated with the skeleton representations;

determine a plurality of joint feature sets of the joints that are associated with a respective plurality of joint features; and determine discriminative joint feature sets that are included in the plurality of joint feature sets, based on a determination of joint feature sets having a high level of confidence and a low level of ambiguity, based on a predetermined confidence threshold value, and a predetermined ambiguity threshold value.

20. The computer program product of claim 19, wherein the executable code is configured to cause the at least one data processing apparatus to:

determine the discriminative joint feature sets based on an Apriori mining function.

* * * * *